US011416336B2

(12) United States Patent
Wong (10) Patent No.: US 11,416,336 B2
(45) Date of Patent: Aug. 16, 2022

(54) MANAGING PARITY DATA ASSOCIATED WITH CONFIGURATION REGISTER DATA (71) Applicant: International Business Machines Corporation, Armonk, NY (US)

(72) Inventor: Kelvin Wong, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 16/653,198

(22) Filed: Oct. 15, 2019

(65) Prior Publication Data

US 2021/0109810 A1    Apr. 15, 2021

(51) Int. Cl.
G06F 11/10 (2006.01)
G06F 5/06 (2006.01)
G06F 9/30 (2018.01)

(52) U.S. Cl.
CPC ............ *G06F 11/1076* (2013.01); *G06F 5/06* (2013.01); *G06F 9/30101* (2013.01)

(58) Field of Classification Search
CPC .... G06F 11/1076; G06F 5/06; G06F 9/30101; G06F 9/46
See application file for complete search history.

(56) References Cited

U.S. PATENT DOCUMENTS 5,218,680 A * 6/1993 Farrell .................... H04L 29/06
709/215
5,754,764 A * 5/1998 Davis .................... G06F 13/385
709/200
6,088,740 A * 7/2000 Ghaffari .............. G06F 13/4018
710/39
7,579,683 B1 * 8/2009 Falik ........................ G11C 5/02
257/691
10,133,625 B2    11/2018 Bandic et al.
(Continued)

OTHER PUBLICATIONS

IBM, "Arrangement for Providing Parity Bits," An IP.com Prior Art Database Technical Disclosure, IP.com No. IPCOM000055993D, Original Publication: Oct. 1, 1980, Electronic Publication: Feb. 13, 2005, 3 pages. https://ip.com/IPCOM/000055993.

(Continued)

*Primary Examiner* — Bryce P Bonzo
*Assistant Examiner* — Michael Xu
(74) *Attorney, Agent, or Firm* — Eric Chesley (57) ABSTRACT

Parity data associated with commands to, and indications from, a configuration register that includes a first command FIFO for receiving commands and a response FIFO for returning indications can be managed. Commands can be tracked by storing the commands in a second command FIFO and a command can be dequeued from the second command FIFO, in response to a command emerging from the response FIFO. Parity data can be generated from the data associated with a write operation, and stored in a parity latch corresponding to the configuration register, in response to the dequeued command being a successfully completed write operation. The generated parity data can be read from a parity latch corresponding to the configuration register and provided the generated parity data for return with an indication that the dequeued command is a successfully completed write operation.

20 Claims, 5 Drawing Sheets

(56) References Cited

U.S. PATENT DOCUMENTS

| | | |
|---|---|---|
| 10,290,333 B2 | 5/2019 | Lee et al. |
| 2008/0040541 A1* | 2/2008 | Brockmann ........ G06F 11/1076 |
| | | 711/E12.084 |
| 2018/0189133 A1 | 7/2018 | Prathapan et al. |
| 2018/0341547 A1 | 11/2018 | Bolkhovitin |
| 2020/0119753 A1* | 4/2020 | Chirca ................ G06F 9/30101 |

OTHER PUBLICATIONS

"Microchip Enters Memory Infrastructure Market with Serial Memory Controller for High-performance Data Center Computing," Press Release, Microchip, Aug. 5, 2019, 2 pages. https://www.microchip.com/en/pressreleasepage/microchip-enters-memory-infrastructure-market-with-serial-memory.

"SMC 1000 8x25G: Smart Memory Controller," Data Center Solutions, Microsemi, 2019, 2 pages. https://www.microsemi.com/product-directory/memory-solutions/5551-smart-memory-controller-1000.

\* cited by examiner

MANAGING PARITY DATA ASSOCIATED WITH CONFIGURATION REGISTER DATA

BACKGROUND

The present disclosure relates to managing parity data, and more specifically to managing parity data associated with commands to, and indications from, configuration registers associated with various data transfer protocols.

Data transfer protocols such as Peripheral Component Interconnect (PCI) or Open Coherent Accelerator Processor Interface (OpenCAPI) can specify a set of configuration registers. These configuration registers can provide a variety of functions including storing the ID of a device and/or the ID of the device vendor, and defining the range of addresses owned by the device within a memory space. Since this set of configuration registers is standard, many design houses market Intellectual Property (IP) which implements these configuration registers. Accordingly, this IP can be simply inserted into an integrated circuit (IC) or chip design which uses a data transfer protocol. This design practice can be popular, for example, when designing a chip design from an Field Programmable Gate Array (FPGA).

A problem with this solution is that since such IP is typically targeted for FPGA designs, IC design houses may not provide parity protection for the configuration registers in the IP. This can be done to reduce the IP cost and reduce the amount of logic, wiring and space taken up by the IP inside the FPGA. This in turn can reduce the overall FPGA project cost and can enable a faster time-to-market. Application-specific integrated circuit (ASIC) designs, particularly ones for enterprise applications, can require parity protection over configuration registers. As a result, when integrating configuration register IP, ASIC designs must implement their own parity protection.

A possible solution to this problem is to check parity over write data for a register update, update the register according to the write data and subsequently discard the accompanying parity. During a read operation, new parity can be generated from the read data when the register value is retrieved. Both the register value and generated parity can then be returned as part of the read indication. A problem with this solution is that, should a latch in a configuration register flip its value between the time it is updated by a write operation and the time it is read back, incorrect data, with parity corresponding to the incorrect data, will be read back without any indication that the latch flip occurred. This is because the parity for the read operation is generated based on the current register value at the time of the read operation which will have occurred after the latch flip.

SUMMARY

Embodiments can be directed towards a computer-implemented method for managing parity data associated with commands to, and indications from, a configuration register. The configuration register can include a first command first-in, first-out (FIFO) for receiving commands and a response FIFO for returning indications. The method includes tracking commands to the configuration register by storing the commands in a second command FIFO and dequeueing a command from the second command FIFO, in response to an indication from the configuration register of a command emerging from the response FIFO. The method also includes generating parity data from the data associated with a write operation and storing the generated parity data in a parity latch corresponding to the configuration register, in response to an indication that the dequeued command is a successfully completed write operation. The method also includes reading, in response to the indication, the generated parity data from a parity latch corresponding to the configuration register and providing the generated parity data for return with the indication that the dequeued command is a successfully completed write operation.

Embodiments can also be directed towards an apparatus for managing parity data associated with commands to, and indications from, a configuration register. The configuration register can have a first command FIFO for receiving commands and a response FIFO for returning indications. The apparatus can include a second command FIFO configured to track commands to the configuration register by storing the commands and a parity latch corresponding to the configuration register configured to store generated parity data. The apparatus can also include an engine control. The engine control can be configured to track commands to the configuration register by storing the commands in a second command FIFO and dequeue a command from the second command FIFO, in response to an indication from the configuration register of a command emerging from the response FIFO. The engine control can also be configured to generate parity data from the data associated with a write operation and store the generated parity data in a parity latch corresponding to the configuration register, in response to an indication that the dequeued command is a successfully completed write operation. The engine control can also be configured to read, in response to the indication, the generated parity data from a parity latch corresponding to the configuration register and provide the generated parity for return with the indication that the dequeued command is a successfully completed write operation.

Embodiments can also be directed towards a computer program product for managing parity data associated with commands to, and indications from, a configuration register. The configuration register can have a first command FIFO for receiving commands and a response FIFO for returning indications. The computer program product can include a computer-readable storage medium having program instructions embodied therewith, the program instructions executable by a computer to cause the computer to track commands to the configuration register by storing the commands in a second command FIFO and dequeue a command from the second command FIFO, in response to an indication from the configuration register of a command emerging from the response FIFO. The program instructions are also executable to cause the computer to generate parity data from the data associated with a write operation and store the generated parity data in a parity latch corresponding to the configuration register, in response to an indication that the dequeued command is a successfully completed write operation. The program instructions are also executable to cause the computer to read, in response to the indication, the generated parity data from a parity latch corresponding to the configuration register and provide the generated parity for return with the indication that the dequeued command is a successfully completed write operation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Figure 1:
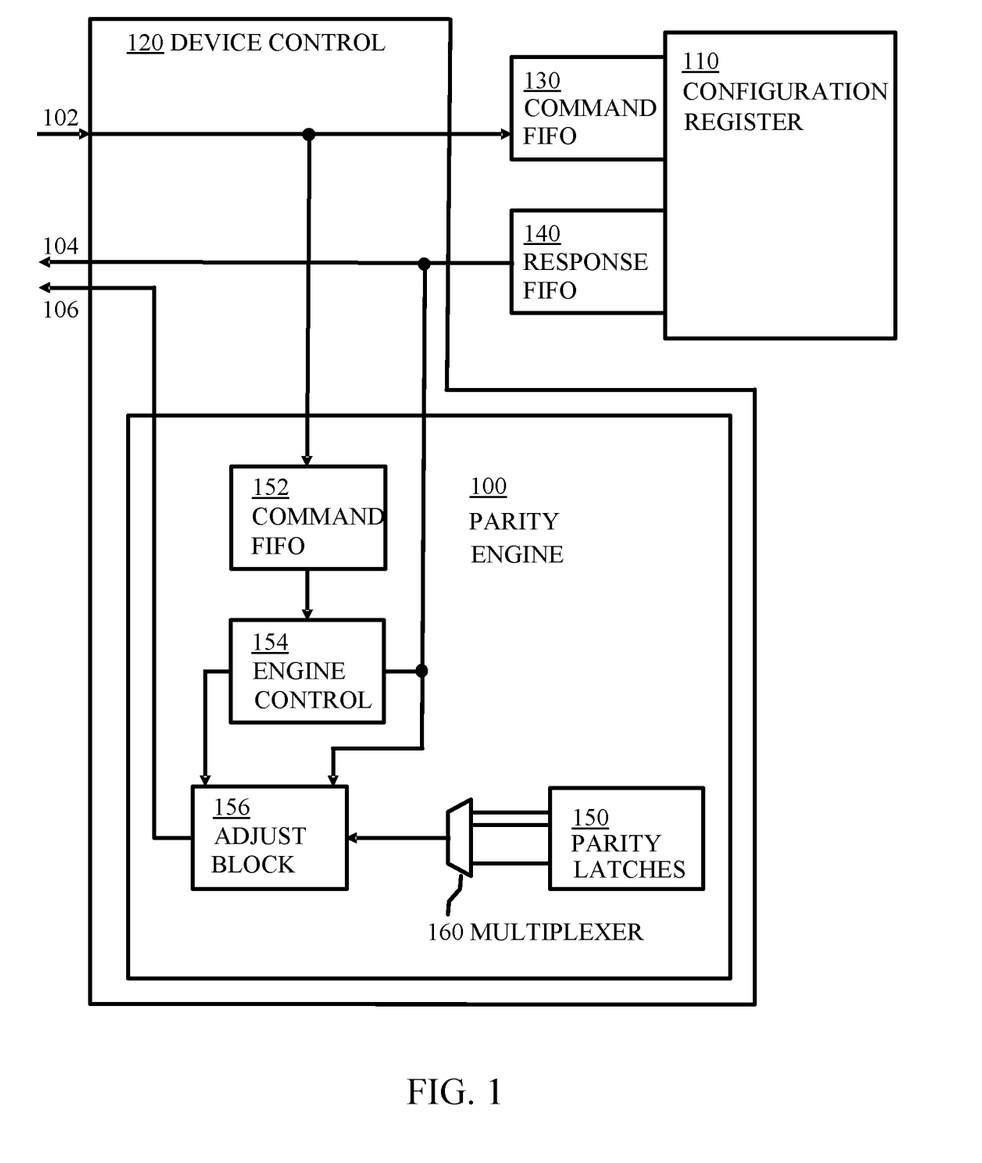
FIG. 1 is a block diagram of an apparatus for managing parity data associated with commands to, and indications from, a configuration register, according to embodiments of the present disclosure.

FIG. 1 is a block diagram depicting a parity engine 100 for managing parity data associated with commands 102 to, and indications 104 from, a configuration register 110. Parity engine 100 is located within device control 120 which manages commands 102 to be sent through a first command first-in, first-out (FIFO) 130 to configuration register 110. Device control 120 also manages indications from configuration register 110 through a response FIFO 140 to be returned as indications 104. Received commands 102 sent by device control 120 to first command FIFO 130 are also sent to parity engine 100 as are indications 104 emerging from response FIFO 140. Parity 106 generated by parity engine 100 is returned through device control 106 together with the indication 104.

Within parity engine 100, there is a parity latch 150 associated with each configuration register 110. In some embodiments, each configuration register 110, can include one parity latch 150 corresponding to the entirety of the configuration register 110. In some embodiments, there can be several parity latches 150, each parity latch 150 corresponding to different portions of the configuration register 110. In some embodiments, such as Peripheral Component Interconnect (PCI) or Open Coherent Accelerator Processor Interface (OpenCAPI), configuration registers 110 can be four bytes wide, with bytewise access permitted. Each configuration register 110 can have four parity latches 150 corresponding to it, each of the four parity latches 150 corresponding to a different byte of the configuration register 110. Embodiments of the disclosure are not limited to use with configuration registers 110 of one byte or four bytes in width, but can be used with configuration registers 110 of any width. Typically, parity latches 150 are designed so as to power on with default values that provide parity consistent with the power on default values of the corresponding configuration registers 110.

The received commands 102 that are sent by device control 120 to parity engine 100 are placed in second command FIFO 152 in parity engine 100. Second command FIFO 152 in the parity engine 100 needs to have a depth of at least one more than the sum of the depth of the first command FIFO 130 and the response FIFO 140. This depth corresponds to the maximum total number of configuration register 110 accesses that can be pending at any one time. For the purpose of discussion, it can be assumed that the starting point is that the first command FIFO 130 and the response FIFO 140 are both full. The configuration register 110 can have taken one command 102 from the first command FIFO 130 and be processing it. While that command 102 is being processed another command 102 can be put into the first command FIFO 130 thus making it full again. The configuration register 110 may not necessarily wait for an empty space in the response FIFO 140 before taking a new command 102 from the first command FIFO 130 to process it. It does however have to wait for an empty space to appear in the response FIFO 140 before it can post the indication for that command 102.

Indications 104 emerging from response FIFO 140 are passed by device control 120 to engine control 154 and adjust block 156. When indications 104 are received by engine control 154, multiplexer 158 selects the appropriate parity data from that stored in parity latches 150 before passing the parity data to adjust block 156 which then returns the parity data 106 through device control 120. Each configuration register 110 has at least one parity bit protecting its data. For bytewise parity and with 32-bit configuration registers 110, this can be four parity bits per configuration register 110. According to embodiments, there can be only one parity bit to cover the entirety of the configuration register 110. Other numbers of parity bits are possible and whatever the number of parity bits, these are stored in parity latches 150 associated with the configuration register 110. The multiplexer 160 selects the correct parity bit or bits that are associated with the configuration register 110 being read and whose data needs to be returned. The function of adjust block 156 is described below with reference to a status bit only being on for the duration during which a time-limited feature is active.

Figure 2:
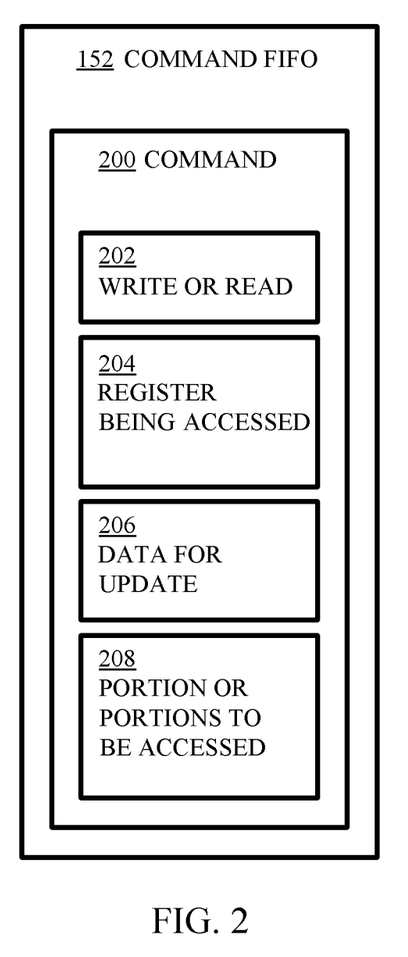
FIG. 2 is a block diagram depicting of the contents of the command first-in, first-out (FIFO) of the parity engine of FIG. 1, according to embodiments consistent with the figures.

FIG. 2 is a block diagram depicting of the contents of a command 200 stored in the second command FIFO 152 of FIG. 1. In some embodiments, second command FIFO 152 includes indications as to whether the command 102 is a write operation or a read operation and which of the configuration registers 110 is being accessed, and if the command 102 is a write operation, the data with which the configuration register 110 is to be updated and which portions or portions of the configuration register 110 are being accessed. As discussed above, second command FIFO 152 stores multiple commands 200, although only one command is shown in FIG. 2.

Write or read 202 indicates whether the command 200 is a write command or a read command. Register being accessed 204 is an identifier indicating which configuration register 110 is being accessed. For write operations Data for update 206 contains the data which is to be written to the configuration register 110. Also for write operations, Portion or Portions to be accessed 208 identifies which portion or portions of the configuration register 110 are to be written to. Protocols such as PCI or OpenCAPI allow bytewise updates to their 4-byte configuration registers 110. Which portions are being accessed can be determined either from byte enables included with the command 200 or by examining the command's 200 byte aligned address and access length.

In an OpenCAPI embodiment, the indication 202 of a write or a read can be determined by the opcode of the command, typically stored as bits 0 to 7 of the command. An opcode of b'1110 0000' can indicate a configuration read command and an opcode of b'1110 0001' can indicate a configuration write. The register being accessed 204 can be determined by the "PA" or Physical Address forming part of the command. In an OpenCAPI implementation utilizing 64 bit physical addresses, bits 0 to 27 of the physical address can be stored at bits 28 to 55 of the command, bits 28 to 55 can be stored at bits 56 to 83 of the command and bits 56 to 63 can be stored at bits 84 to 91 of the command. For write operations, the Data for update 206 is typically contained within data flits which follow the command flit. Also for write operations, Portion or Portions to be accessed 208 is identified by the pLength or pl.(2:0) field (Physical Length), which can be stored at bits 109 to 111 of the command and the bottom two bits of the Physical Address, which represent a byte offset within the configuration register 110, typically stored as bits 28 and 29 of the command. pl.(2:0) represents the power of two of the amount of data to be written. For example, if pl.(2:0) equals b'010', this indicates the length is $2^2$ equals 4 bytes. If the bottom two bits of the Physical address are also PA(1:0)=b'00', then all four bytes of the configuration register are written. In another example, if pl.(2:0) equals b'001', this indicates the length is $2^1$ equals 2 bytes. If the bottom two bits of the Physical address are also PA(1:0)=b'10', then bytes 2 and 3 of the configuration register 110 are written, where the bytes are numbered starting from zero.

Figures 3, 3A:
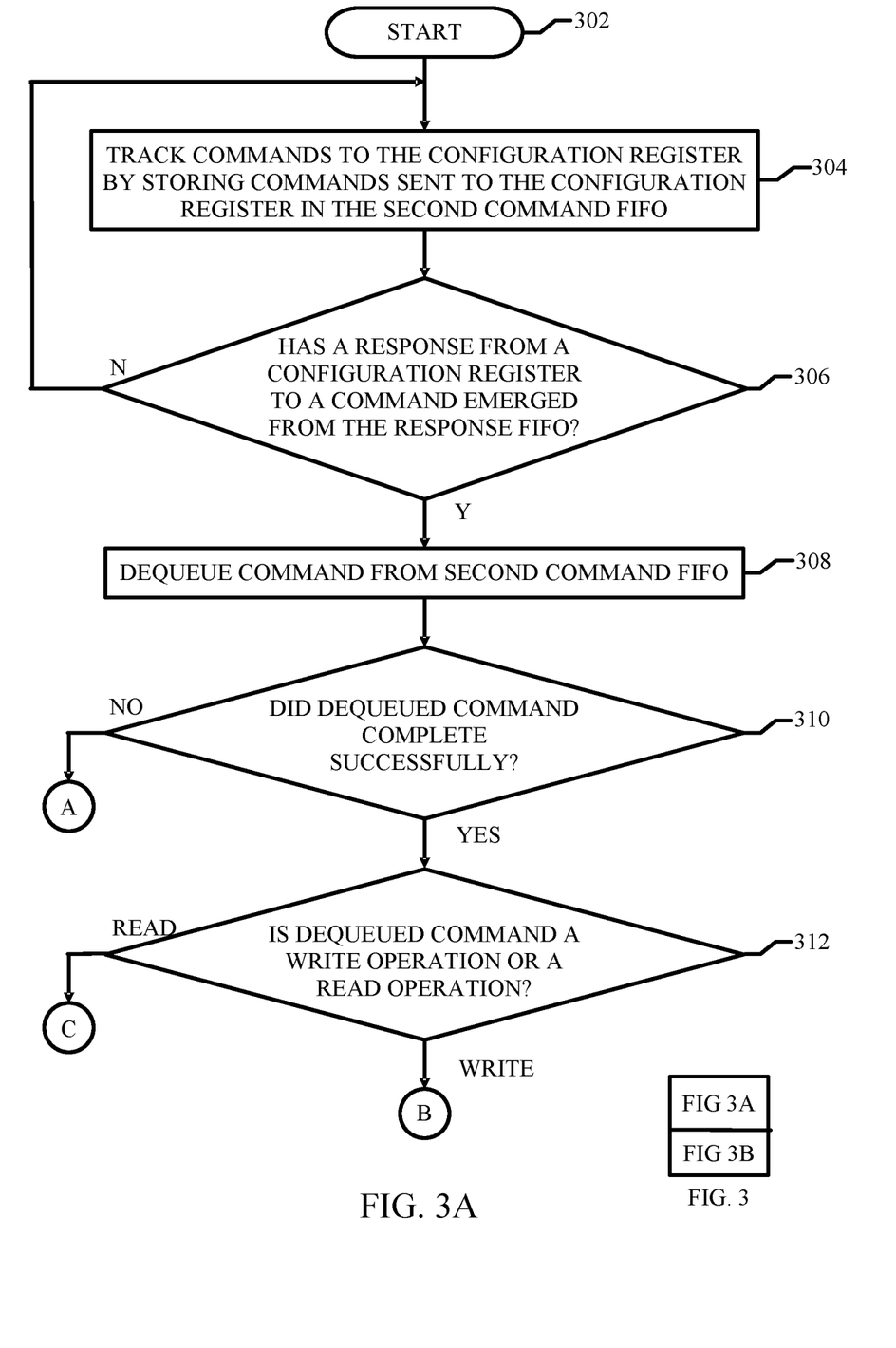
FIG. 3a and FIG. 3b include a flow diagram depicting a computer-implemented method for managing parity data associated with commands to, and indications from, a configuration register, according to embodiments consistent with the figures.

FIG. 3 is a flow diagram depicting a computer-implemented method for managing parity data associated with commands 102 to, and indications 104 from, a configuration register 110. The configuration register 110 includes a first command FIFO 130 for receiving commands and a response FIFO 140 for returning indications. FIG. 3 includes FIG. 3A and FIG. 3B.

Referring to FIG. 3A, an embodiment of a computer-implemented method according to the present disclosure starts at step 302. At step 304, commands 102 to the configuration register 110 are tracked by storing the commands 102 in a second command FIFO 152. At step 306, a determination is made as to whether an indication 104 from a configuration register 110 to a command 102 has emerged from the response FIFO 140. If no indication 104 from a configuration register 110 has emerged from the response FIFO 140, processing returns to operation 304. In response to an indication 104 from the configuration register 110 to one of the commands 102 emerging from the response FIFO 140, processing proceeds to operation 308. At operation 308, a command 102 is dequeued from the second command FIFO 152 by the engine control 154. The indication 104 from the configuration register 110 will correspond to this command 102 because the order in which commands 102 is executed are preserved through the first command FIFO 130 and the response FIFO 140.

Figure 3B:
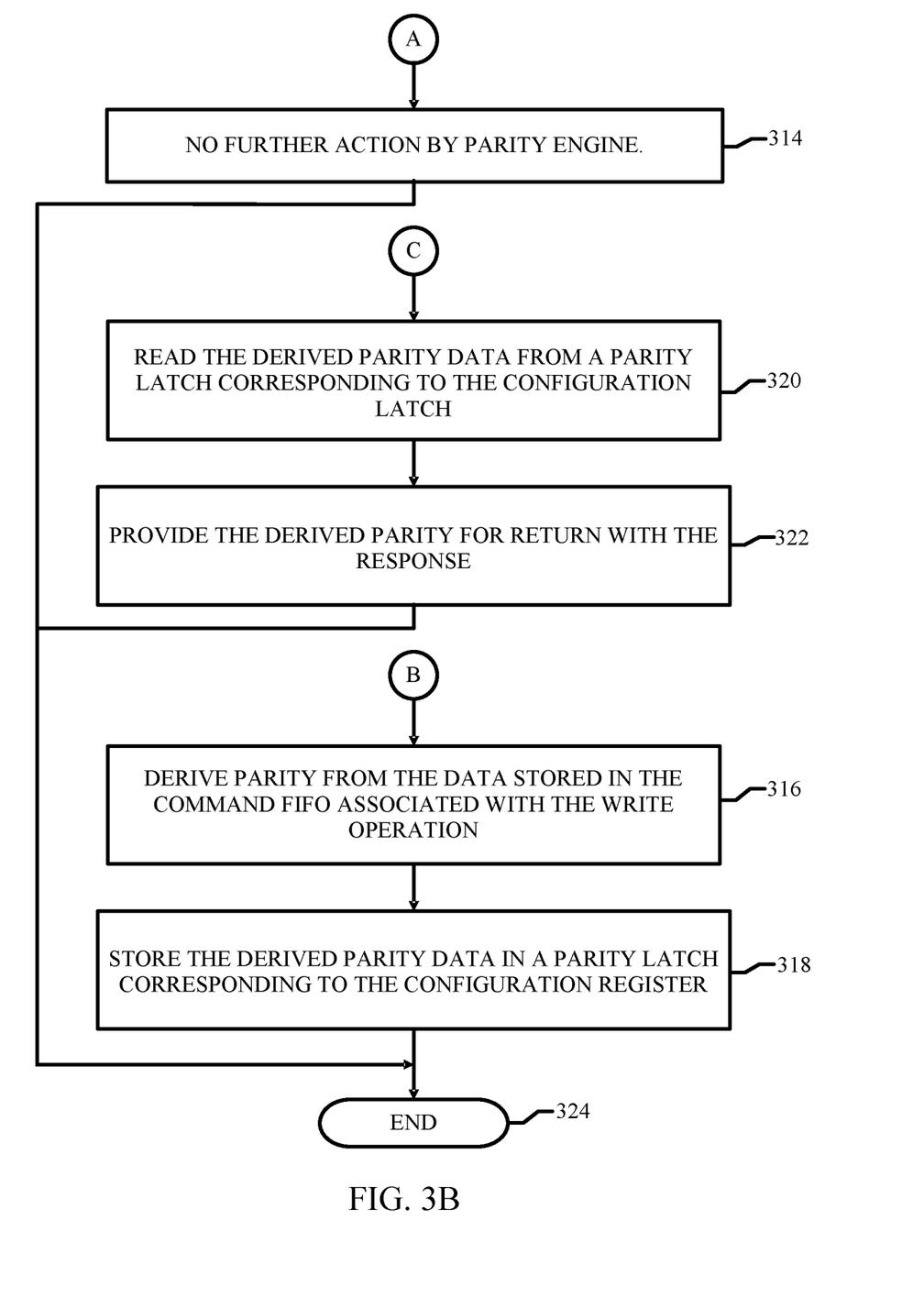

At operation 310, a determination is made as to whether the dequeued command 102 completed successfully. If the dequeued command 102 completed unsuccessfully, processing continues through connector A to operation 314 in FIG. 3B. Referring briefly to FIG. 3B, at operation 314, in response to the dequeued command 102 being completed unsuccessfully, no further action is taken by the Parity Engine 100. Device control 120 returns the indication 104 to the requester to indicate that the command 102 was unsuccessful. The computer-implemented method ends at operation 324. Returning to FIG. 3A, if the dequeued command 102 completed successfully, processing continues to operation 312. At operation 312, a determination is made as to whether the dequeued command 102 is a write operation or a read operation.

If the dequeued command checked at operation 312 is a write operation, then processing continues through connector B to operation 316 in FIG. 3B. Referring to FIG. 3B, at operation 316, parity is generated from the data associated with the write operation stored in the command FIFO 152. This derivation of parity is also dependent on the accessibility of individual register bits. Each bit of the generated parity stored in the parity latch 150 can include, for example, one of a Read-Writeable (RW) bit, a Read-only (RO) bit, a Write-only (WO) bit, a "Write 1 to Set" (W1S) bit or a "Write 1 to Clear" (W1C) bit. For example, if bytewise parity is used and one entire byte of a configuration register 110 contains only RW bits then the incoming parity for that byte of the configuration register 110 can be stored directly into the appropriate parity latch 150 in the Parity Engine 100. In another example, the most significant bit (MSB) of the configuration register 110 byte may be a RO bit and always return zero when read. In this example, the generated parity is the parity of the incoming write data byte XORed with the MSB of the incoming write data byte. In this way, configuration register 110 parity is generated directly from incoming write data parity and not regenerated. The parity regeneration used in the prior art masks potential parity errors. At operation 318, the generated parity data is stored in a parity latch 150 corresponding to the configuration register 110 that was successfully written to based upon the parity that accompanied the write data as part of the command 102.

Although it is not necessary, the incoming write data parity can be checked and an error flagged if bad parity is detected. Otherwise, bad parity can be detected by a read requester when the configuration register 110 when that configuration register 110 is read back at a later time. The computer-implemented method ends at operation 324.

If the dequeued command checked at operation 312 of FIG. 3A is a read operation, then processing continues through connector C to operation 320 in FIG. 3B. At operation 320, the generated parity data is read from a parity latch 150 corresponding to the configuration register 110. At operation 322, the generated parity data is provided for return with the indication 104. The generated parity data is then multiplexed out through multiplexer 160 to be returned as returned parity data 106 together with the read data 104. The computer-implemented method ends at operation 324.

Although it is not necessary, the outgoing read data parity 106 received with the read indication 104 can be checked and an error flagged if bad parity detected. Otherwise the outgoing read parity data 106 can be checked by the read requester when it receives the data 104 and corresponding parity 106 from the Device Control 120.

In some embodiments, the generated parity includes one parity bit associated with the entirety of the configuration register 110. In some embodiments, the generated parity includes a plurality of parity bits, each of the plurality of parity bits being associated with different portions of a configuration register 110.

If the command 102 that completed successfully was a write operation to a Function Reset bit, which causes a subset of the configuration registers 110 to be reset back to their default values, the Parity Engine 100 stores default values in parity latches 150 corresponding to the subset of the configuration registers 110.

If the command 102 that completed successfully was a read operation from a configuration register 110 that contains a status bit for a time limited feature, then the generated parity may have to be adjusted to correspond to the current value of the status bit as part of the provision of the generated parity.

If the status bit is only on for the duration during which the time-limited feature is active, and, for example, is zero at other times, then any write operations to that configuration register 110 will generate parity assuming that that status bit is zero, similar to the example of parity derivation with the RO bit described above. When the configuration register 110 is read, the Parity Engine 100 examines the return value of the status bit. If the status bit is set, then the corresponding parity latch 150 for that configuration register 110 or, if bytewise parity is used, the configuration register 110 byte is inverted via the Parity Adjust 156 block before being returned with the read data 104 by the Device Control 120. The inversion takes into account the fact that hardware has driven the status bit high when it is typically zero and assumed to be so whenever that register is written, regardless of the incoming write data. An example of such a time-limited feature in the OpenCAPI protocol is the Accelerator Functional Unit (AFU) descriptor retrieval mechanism where hardware sets a "valid" bit low in a configuration register 110 to zero while it is retrieving some descriptor data, then drives it high to indicate that the data is ready.

Figure 4:
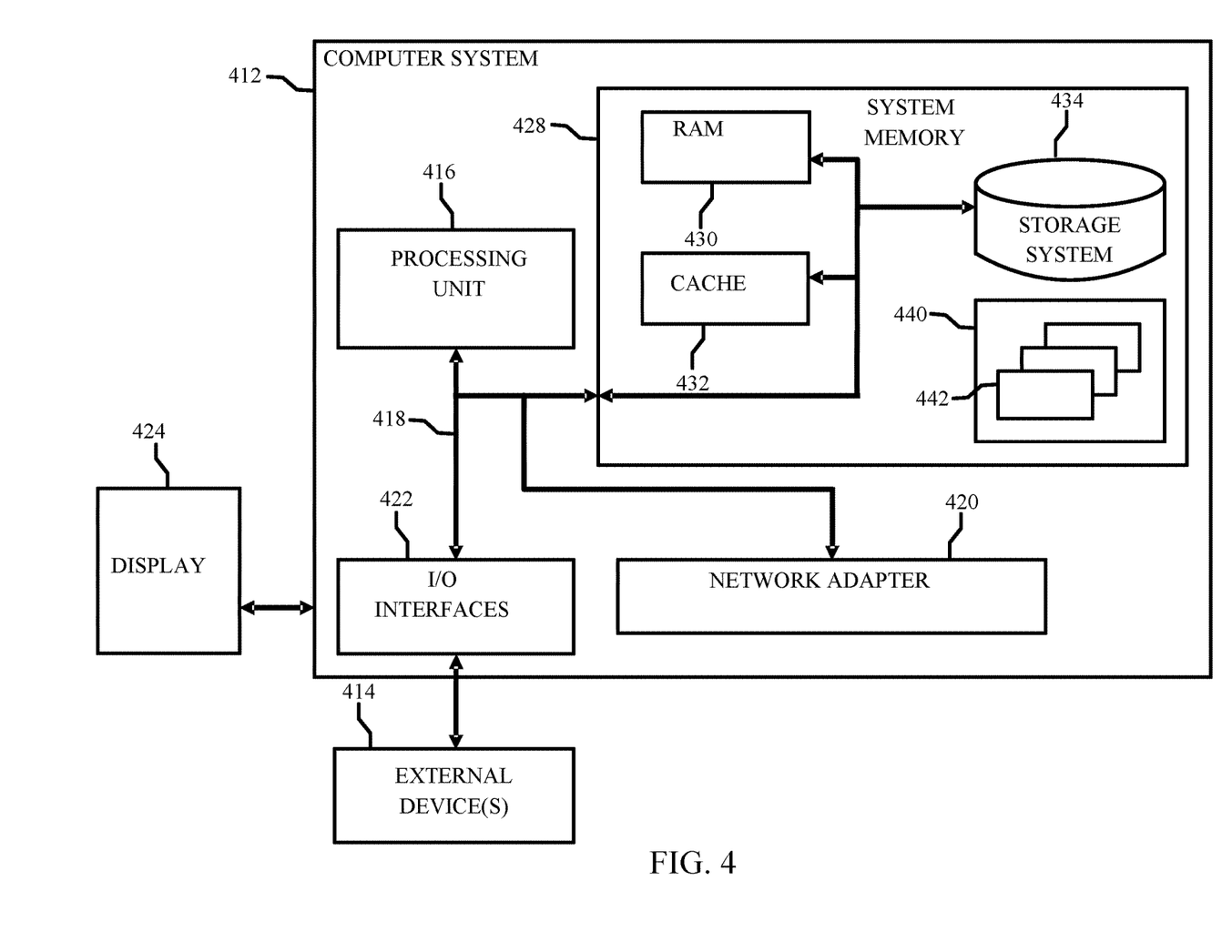
FIG. 4 is a block diagram of a computer system in which embodiments of the present disclosure can be implemented, according to embodiments consistent with the figures.

Referring now to FIG. 4, a schematic of an example of computing system is shown. Computing system 412 is only one example of a suitable computing system and is not intended to suggest any limitation as to the scope of use or functionality of embodiments of the disclosure described herein. Regardless, computing system 412 is capable of being implemented and/or performing any of the functionality set forth hereinabove.

Computer system/server 412 is operational with numerous other general purpose or special purpose computing system environments or configurations. Examples of well-known computing systems, environments, and/or configurations that can be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

Computer system/server 412 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 412 can be practiced in distributed cloud computing environments where tasks are performed by remote processing devices that are linked through a communications network. In a distributed cloud computing environment, program modules can be located in both local and remote computer system storage media including memory storage devices.

As depicted in FIG. 4, computer system/server 412 can have the form of a general-purpose computing device. The components of computer system/server 412 can include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media can be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 can further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 can include at least one program product having a set (e.g., at least one) of program modules that are configured to carry out the functions of embodiments of the disclosure.

Program/utility 440, having a set (at least one) of program modules 442, can be stored in memory 428 by way of example, and not limitation, as well as an operating system, one or more application programs, other program modules, and program data. Each of the operating system, one or more application programs, other program modules, and program data or some combination thereof, can include an implementation of a networking environment. Program modules 442 generally carry out the functions and/or methodologies of embodiments of the disclosure as described herein.

Computer system/server 412 can also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Embodiments of the present disclosure can include a system, a method, and/or a computer program product. The computer program product can include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, column-programmable gate arrays (FPGA), or programmable logic arrays (PLA) can execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, an apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing an apparatus to produce a machine, such that the instructions, which execute via the processor of the computer or other programmable data processing an apparatus, create means for implementing the functions/acts specified in the flowchart and/or block diagram block or blocks. These computer-readable program instructions can also be stored in a computer-readable storage medium that can direct a computer, a programmable data processing an apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing an apparatus, or other device to cause a series of operational steps to be performed on the computer, other programmable an apparatus or other device to produce a computer-implemented process, such that the instructions which execute on the computer, other programmable an apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing parity data associated with commands to, and indications from, a configuration register, the configuration register including a first command FIFO for receiving commands and a response FIFO for returning indications, the method comprising:
    tracking commands to the configuration register by storing the commands in a second command FIFO to determine successful completion of the commands;
    dequeueing a command from the second command FIFO, in response to an indication from the configuration register of a command emerging from the response FIFO;
    generating parity data from data associated with a write operation and storing the generated parity data in a parity latch corresponding to the configuration register, in response to an indication that the dequeued command is a successfully completed write operation; and
    reading, in response to the indication, the generated parity data from the parity latch corresponding to the configuration register and providing the generated parity data for return with the indication that the dequeued command is a successfully completed write operation.

2. The computer-implemented method of claim 1, wherein the generated parity data comprises data selected from the group consisting of: a parity bit associated with all of the configuration register and a plurality of parity bits wherein each bit of the plurality of parity bits is associated with different portions of the configuration register.

3. The computer-implemented method of claim 1 wherein the second command FIFO includes:
    an indication of a command type selected from the group consisting of: a write operation and a read operation;
    an indication of which configuration register is being accessed;
    in response to the command type being a write operation, data used to update the configuration; and
    an indication of which portion of the configuration register is being accessed.

4. The computer-implemented method of claim 1, wherein each bit of the generated parity stored in the parity latch comprises a bit selected from the group consisting of: a read-writeable bit, a read-only (RO) bit, a write-only (WO) bit, a write 1 to set bit and a write 1 to clear bit.

5. The computer-implemented method of claim 1 further comprising one at least one of:
    checking parity data received with incoming write data and flagging an error if bad parity is detected; and
    checking parity data received with a read indication and flagging an error if bad parity is detected.

6. The computer-implemented method of claim 1, wherein:
    the dequeued command includes a write operation to a function reset bit that causes a subset of the configuration register to be reset to default values; and
    the storing of the generated parity data in the parity latch comprises storing default values in the parity latch corresponding to the subset of the configuration register.

7. The computer-implemented method of claim 1, wherein:
    the dequeued command comprises a read operation from the configuration register that contains a status bit for a time-limited feature; and
    providing the generated parity data for return with the indication comprises adjusting the generated parity to correspond to a current value of the status bit.

8. An apparatus for managing parity data associated with commands to, and indications from, a configuration register, the configuration register having a first command FIFO for receiving commands and a response FIFO for returning indications, the apparatus comprising:
    a second command FIFO configured to track commands to the configuration register by storing the commands;
    a parity latch corresponding to the configuration register configured to store generated parity data; and
    an engine control configured to:
        track commands to the configuration register by storing the commands in the second command FIFO to determine successful completion of the commands;
        dequeue a command from the second command FIFO, in response to an indication from the configuration register of a command emerging from the response FIFO;
        generate parity data from data associated with a write operation and store the generated parity data in the parity latch corresponding to the configuration register, in response to an indication that the dequeued command is a successfully completed write operation; and
        read, in response to the indication, the generated parity data from the parity latch corresponding to the configuration register and provide the generated parity for return with the indication that the dequeued command is a successfully completed write operation.

9. The apparatus of claim 8, wherein the generated parity data comprises data selected from the group consisting of: a parity bit associated with all of the configuration register and a plurality of parity bits wherein each bit of the plurality of parity bits is associated with different portions of the configuration register.

10. The apparatus of claim 8 wherein the second command FIFO includes:
    an indication of a command type selected from the group consisting of: a write operation and a read operation;
    an indication of which configuration register is being accessed;
    in response to the command type being a write operation, data used to update the configuration; and
    an indication of which portion of the configuration register is being accessed.

11. The apparatus of claim 8, wherein each bit of the generated parity stored in the parity latch comprises a bit selected from the group consisting of: a read-writeable bit, a read-only (RO) bit, a write-only (WO) bit, a write 1 to set bit and a write 1 to clear bit.

12. The apparatus of claim 8 wherein the engine control is configured to:
    check parity data received with incoming write data and flag an error if bad parity is detected; and check parity data received with a read indication and flag an error if bad parity is detected.

13. The apparatus of claim 8, further comprising an adjust block configured to:
store the generated parity data in the parity latch by storing default values in the parity latch corresponding to a subset of the configuration register, in response to the dequeued command including a write operation to a function reset bit that causes the subset of the configuration register to be reset to default values.

14. The apparatus of claim 8, further comprising an adjust block configured to, in response to the dequeued command including a read operation from the configuration register that includes a status bit for a time-limited feature, provide the generated parity data for return with the indication by adjusting the generated parity to correspond to a current value of the status bit.

15. A computer program product for managing parity data associated with commands to, and indications from, a configuration register, the configuration register having a first command FIFO for receiving commands and a response FIFO for returning indications, the computer program product comprising:
a computer-readable storage medium having program instructions embodied therewith, the program instructions executable by a computer to cause the computer to:
track commands to the configuration register by storing the commands in a second command FIFO to determine successful completion of the commands;
dequeue a command from the second command FIFO, in response to an indication from the configuration register of a command emerging from the response FIFO;
generate parity data from the data associated with a write operation and store the generated parity data in a parity latch corresponding to the configuration register, in response to an indication that the dequeued command is a successfully completed write operation; and
read, in response to the indication, the generated parity data from the parity latch corresponding to the configuration register and provide the generated parity for return with the indication that the dequeued command is a successfully completed write operation.

16. The computer program product of claim 15, wherein the generated parity data comprises data selected from the group consisting of: a parity bit associated with all of the configuration register and a plurality of parity bits wherein each bit of the plurality of parity bits is associated with different portions of the configuration register.

17. The computer program product of claim 15 wherein the second command FIFO includes:
an indication of a command type selected from the group consisting of: a write operation and a read operation;
an indication of which configuration register is being accessed;
in response to the command type being a write operation, data used to update the configuration; and
an indication of which portion of the configuration register is being accessed.

18. The computer program product of claim 15, wherein each bit of the generated parity stored in the parity latch comprises a bit selected from the group consisting of: a read-writeable bit, a read-only (RO) bit, a write-only (WO) bit, a write 1 to set bit and a write 1 to clear bit.

19. The computer program product of claim 15 further comprising one at least one of:
checking parity data received with incoming write data and flagging an error if bad parity is detected; and
checking parity data received with a read indication and flagging an error if bad parity is detected.

20. The computer program product of claim 15, wherein:
the dequeued command includes a write operation to a function reset bit that causes a subset of the configuration register to be reset to default values; and
the storing of the generated parity data in the parity latch comprises storing default values in the parity latch corresponding to the subset of the configuration register.

* * * * *